United States Patent
Kuttner et al.

(10) Patent No.: US 7,322,635 B2
(45) Date of Patent: Jan. 29, 2008

(54) COVER DEVICE FOR THE VEHICLE TOP STORAGE COMPARTMENT OF A CONVERTIBLE VEHICLE

(75) Inventors: Hans-Peter Kuttner, Weil im Schoenbuch (DE); Bernhard Schenk, Boeblingen (DE)

(73) Assignee: DaimlerChrysler AG, Stuttgart (DE)

( * ) Notice: Subject to any disclaimer, the term of this patent is extended or adjusted under 35 U.S.C. 154(b) by 366 days.

(21) Appl. No.: 10/514,885

(22) PCT Filed: Mar. 28, 2003

(86) PCT No.: PCT/EP03/03260

§ 371 (c)(1),
(2), (4) Date: Aug. 25, 2005

(87) PCT Pub. No.: WO03/097392

PCT Pub. Date: Nov. 27, 2003

(65) Prior Publication Data

US 2006/0131925 A1 Jun. 22, 2006

(30) Foreign Application Priority Data

May 18, 2002 (DE) ................................ 102 22 189

(51) Int. Cl.
*B60J 7/20* (2006.01)
(52) U.S. Cl. .............................. 296/107.08; 296/136.06
(58) Field of Classification Search ........... 296/107.08, 296/136.06
See application file for complete search history.

(56) References Cited

U.S. PATENT DOCUMENTS 6,364,396 B1 * 4/2002 Hayashi et al. ........ 296/136.06
6,454,343 B1 * 9/2002 Wagner et al. ......... 296/107.08
2002/0041109 A1 * 4/2002 Wagner et al. ......... 296/107.08
2002/0149227 A1 * 10/2002 Wagner et al. ......... 296/107.08

FOREIGN PATENT DOCUMENTS

| DE | 19637005 C1 | 12/1997 |
| DE | 4446483 C2 | 2/1998 |
| DE | 19712967 A1 | 10/1998 |
| DE | 29812165 U1 | 6/1999 |
| DE | 10051615 A1 | 5/2001 |
| DE | 19963668 A1 | 7/2001 |
| DE | 10050286 A1 | 4/2002 |
| EP | 1038710 A1 | 9/2000 |

* cited by examiner

*Primary Examiner*—Jason S Morrow
(74) *Attorney, Agent, or Firm*—Crowell & Moring LLP

(57) ABSTRACT

The present invention relates to a cover device for a vehicle top storage compartment of a convertible vehicle. A cover can be pivoted between a closed position and an open position. Two side flaps are arranged on sides of the cover that lie opposite each other transversely with respect to the longitudinal axis of the vehicle, which side flaps can be pivoted between a passive position, in which they open lateral passage openings, and an active position, in which they close the passage openings. A particularly inexpensive construction is achieved by the fact that the side flaps are mounted on the cover in each case via a bearing arrangement which makes it possible to lower the particular side flap relative to the cover and to pivot the side flap under the cover. A driving device provided for adjusting the side flaps is designed exclusively for the pivoting adjustment about the flap axis, which is defined by the sleeve and the bolt. The side flaps are mounted and arranged in such a manner that the lowering of the side flaps takes place automatically when the cover is opened.

20 Claims, 2 Drawing Sheets

COVER DEVICE FOR THE VEHICLE TOP STORAGE COMPARTMENT OF A CONVERTIBLE VEHICLE

The present invention relates to a cover device for a vehicle top storage compartment of a convertible vehicle in which the compartment serves to store a vehicle roof.

A cover device of this type is disclosed in German patent document DE 44 46 483 C2 and has a cover which is mounted in a manner such that it can be adjusted by pivoting about a cover axis, which runs transversely with respect to the longitudinal axis of the vehicle and horizontally, between a closed position and an open position. In its closed position, the cover extends essentially in a horizontal plane and closes a vehicle top storage compartment opening. In its open position, the cover is inclined relative to the horizontal plane, in which case it opens or releases the vehicle top storage compartment opening. Two side flaps which can be adjusted in each case between a passive position and an active position are arranged on sides of the cover that lie opposite each other transversely with respect to the longitudinal axis of the vehicle. With the cover adjusted into its closed position, the side flaps, in their passive position, in each case open a passage opening which is laterally adjacent to the cover on each side of the vehicle and is required for the closed vehicle roof in order to guide a roof component, e.g. a "C-pillar", out of the vehicle top storage compartment. In their passive position, the side flaps are situated above the cover, are pivoted in above the cover and extend parallel thereto. In their active position, the side flaps close the passage openings if the cover is in its closed position. In the active position, the side flaps extend in the plane of the cover, i.e. the side flaps and the cover extend in the same plane.

The known cover device has a first driving device which drives the cover about its cover axis for the pivoting adjustment. For the adjustment of the side flaps, a second driving device is provided which drives the side flaps in each case about an associated flap axis, which runs in each case perpendicularly with respect to the cover, for the pivoting adjustment. The second driving device has, for each side flap, a pivoting bracket which can be pivoted with the cover and to which a cylindrical bolt is fastened. A cylindrical slotted-guide sleeve, in whose wall a guide groove is incorporated, is placed onto this bolt. A guide pin of the pivoting bracket engages in this guide groove. In addition, a reversing lever is mounted on the pivoting bracket, the lever engaging at one end in a guide ring formed on the slotted-guide sleeve and being drivable at the other end by means of Bowden cable. The Bowden cable is connected at its other end to a tension lever which is actuated with the aid of a slotted-guide mechanism. This slotted-guide mechanism is connected fixedly to a slide on which the cover is mounted and which can be adjusted together with the cover in the longitudinal direction of the vehicle. This results in a kinematic coupling which, when the cover is adjusted in the longitudinal direction of the vehicle, uses the slotted-guide mechanism to pivot the tension lever which, as a result, uses the Bowden cable to pivot the reversing lever, as a result of which the latter causes a lifting adjustment of the slotted-guide sleeve, which adjustment causes a rotation of the slotted-guide sleeve and of the side flap fastened thereto because of the guide pin engaging in the guide groove.

German patent document DE 196 37 005 C1 discloses a further cover device in which a cover likewise has laterally arranged side flaps. In this cover device, the side flaps are in each case mounted on the cover about a pivot axis running in the plane of the cover via a hinge band on the cover. The drive takes place via a tension cable which is deflected a number of times and is kinematically coupled to a driving device for adjusting the cover. The resetting takes place by means of corresponding spring means.

German patent document DE 298 12 165 U1 discloses a further cover device in which side flaps are arranged at the sides of the cover. These side flaps serve both when the vehicle roof is open and when the vehicle roof is closed to close openings which are laterally adjacent to the cover. Accordingly, these side flaps are always in their active position when the cover is in its closed position, irrespective of whether the vehicle roof is open or closed. Only in the open position of the cover are the side flaps pivoted in under the cover. For driving the side flaps, for each side flap a bearing shaft is mounted on the lower side of the cover in a manner such that it can rotate about its longitudinal axis and is connected in a rotationally fixed manner to the particular side flap. Furthermore, a supporting lever which supports the particular side flap is mounted on the particular bearing shaft.

The present invention is concerned with the problem of specifying for a cover device of the type mentioned at the beginning an improved embodiment which, in particular, has a construction which can be realized particularly inexpensively.

This problem is solved by the present invention. Advantageous embodiments are the subject matter of dependent claims.

The present invention is based on the general concept of decoupling the pivoting adjustment of the side flaps from the lifting adjustment thereof and at the same time forcibly coupling the lifting adjustment of the side flaps to the pivoting adjustment of the cover. This makes it possible for the driving device, which is provided for the adjustment of the side flaps, to be of comparatively simple construction, since it only has to bring about the pivoting of the side flaps. This is achieved by means of appropriately configured bearing arrangements which are designed in such a manner that the lifting adjustment and the pivoting adjustment of the side flaps are decoupled from each other. In addition, the mounting or arrangement of the side flaps takes place in such a manner that the lifting adjustment of the side flaps takes place automatically when the cover is opened or when the cover is closed.

In one preferred embodiment, the lowering of the side flaps or the lifting adjustment thereof can take place by means of gravitational force, by means of spring force of a spring, or by means of the resistance force of a stop or a guide slot, e.g. a curve in the track, when the cover is opened.

The second driving device, which is provided for implementing the pivoting adjustment of the side flaps, is expediently coupled in terms of drive directly or indirectly to the cover and/or to the first driving device, which is provided for pivoting adjustment of the cover, in such a manner that, during an adjustment of the cover, the side flaps are inevitably driven.

In one particularly advantageous embodiment, the integration of the lifting adjustment of the side flaps in the kinematics of the cover takes place by means of two rotary/sliding bearings via which the side flaps are mounted on the cover. These rotary/sliding bearings in each case comprise a bolt which is mounted in a rotatable and axially adjustable manner in a sleeve. The provision of the rotary/sliding bearings on the lower side of the cover makes it possible for the side flaps to be driven by gravitational force, at least when there are small angles between the cover and a horizontal plane, into a position which is lowered relative to the cover. When the cover is pivoted downward, the supports assigned to the side flaps cause the side flaps to remain stationary relative to the supports while the cover pivots further downward. In this way, the side flaps are raised in their active position to the level of the cover or the cover is lowered to the level of the side flaps. When the cover is pivoted upward, the kinematic reversal takes place, with the result that the cover is initially raised relative to the side flaps and only carries the latter along when the maximum extension length of the rotary/sliding bearings, which length is defined by a corresponding stop, is reached.

In one preferred development, the cover can be adjusted between a front position, in which, when the vehicle roof is closed, the cover takes up a front closed position in which the cover opens a passage gap, which is rearwardly adjacent to the cover with respect to the direction of travel and is required for the closed vehicle roof, and a rear position, in which, when the vehicle roof is opened, the cover takes up a rear closed position with respect to the direction of travel in which the cover closes the passage gap. A section of the vehicle roof which is at the rear with respect to the direction of travel can be guided out of the vehicle top storage compartment through the passage gap formed in this manner. This is advantageous in particular if the vehicle roof is a "hardtop" which is movable and can be folded away and unfolded.

In one development, the first driving device can drive the cover essentially in the longitudinal direction of the vehicle to adjust it between the front position and the rear position, the second driving device then expediently being kinematically coupled to the first driving device in such a manner that an adjustment of the cover from its rear position into its front position pivots the particular side flap into its passive position, and an adjustment of the cover from its front position into its rear position pivots out the particular side flap into its active position. By means of this measure, the second driving device is virtually integrated in the first driving device, with the actuation of the second driving device being coupled to the sliding adjustment of the cover by means of the first driving device. This is particularly expedient, since, firstly, a pivoting adjustment of the side flaps is required only if the lateral passage openings have to be opened or closed, i.e. if, for the opening or for the closing of the vehicle roof, the rear passage gap also has to be opened or closed. Secondly, this measure results in a considerable simplification of the construction of the second driving device.

The support for the particular side flap is expediently formed by a step formed on the edge of the associated passage opening. A step of this type may already be taken into consideration during the production of the trim panel which has the edge, and so essentially no additional expense is incurred for the realization of the support.

Further important features and advantages of the invention emerge from the subclaims, from the drawings and from the associated description of the figures with reference to the drawings.

It goes without saying that the features mentioned above and the features which have yet to be explained below can be used not only in the respectively stated combination, but also in other combinations or on their own without departing from the scope of the present invention.

A preferred exemplary embodiment of the invention is illustrated in the drawings and is explained in greater detail in the following description, with the same reference numbers referring to identical or functionally identical or similar components.

DETAILED DESCRIPTION OF THE INVENTION

Figure 1:
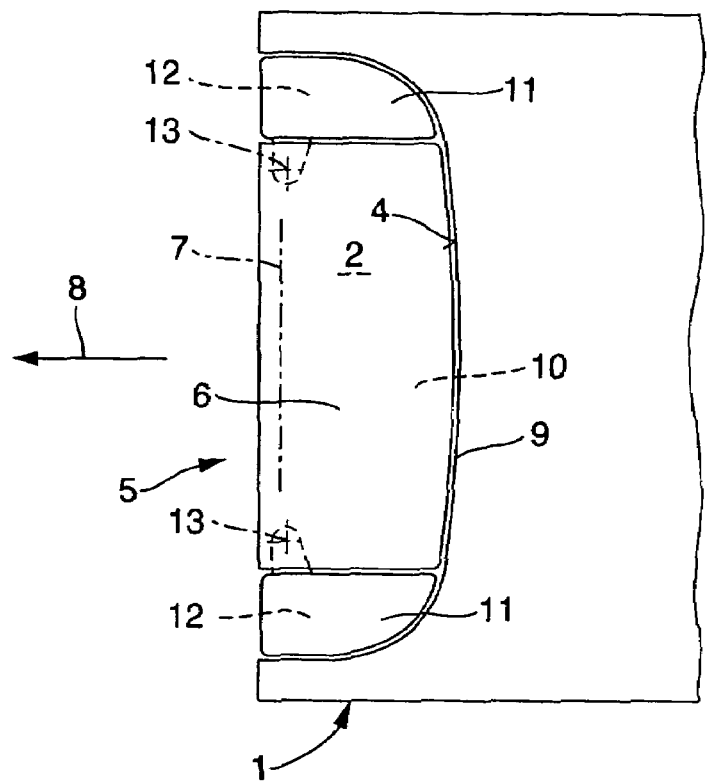
FIG. 1 shows a greatly simplified plan view of a rear region of a convertible vehicle (otherwise not illustrated) which is equipped with a cover device according to the invention, with the vehicle roof open.
Figure 2:
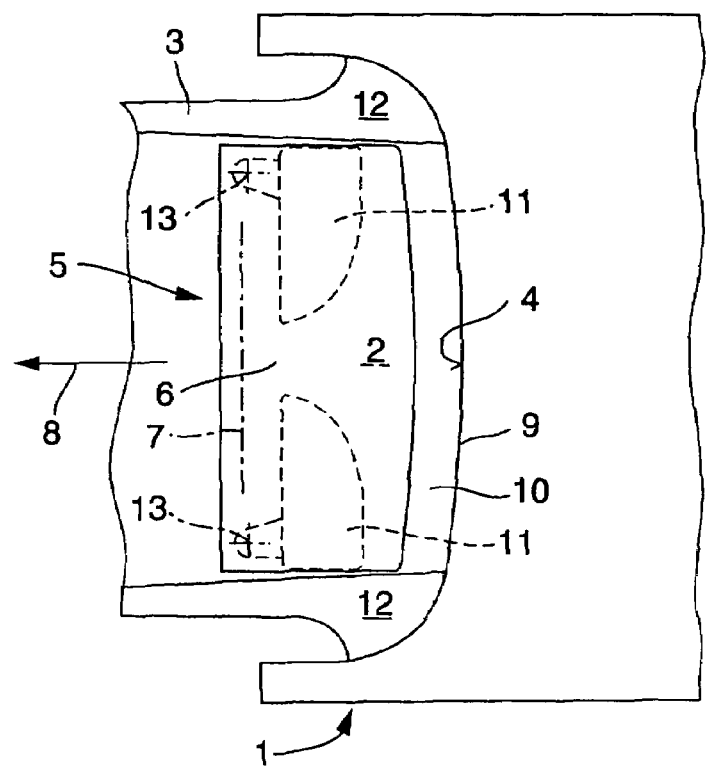
FIG. 2 shows a view as in FIG. 1, but with the vehicle roof closed.

According to FIGS. 1 and 2, a convertible vehicle 1 has, in a rear region illustrated here, a vehicle top storage compartment 2 which serves to accommodate a vehicle roof 3. This vehicle roof 3 can be designed as a "softtop" and can accordingly consist essentially of a woven material. It is likewise possible to design the vehicle roof as a "hardtop", with the result that it consists essentially of shell elements.

The vehicle top storage compartment 2 has a vehicle top storage compartment opening 4 through which the vehicle roof 3 can be moved into the vehicle top storage compartment 2 or out of the vehicle top storage compartment 2. The vehicle 1 is equipped with a cover device 5 according to the invention, which has a cover 6 which can be formed as a single part or in a number of parts. In the embodiment shown here, the cover 6 is designed as a single part. The cover 6 is mounted in a manner such that it can be adjusted by pivoting about a cover axis 7 between a closed position, which is shown in FIGS. 1, 2, 3 and 6, and an open position, which is shown in FIG. 5. This cover axis 7 runs essentially horizontally and transversely with respect to a longitudinal axis 8 of the vehicle. Accordingly, the cover axis 7 lies in the plane of projection in each case in FIGS. 1 and 2 whereas it is perpendicular to the plane of projection in FIGS. 3 to 6.

According to FIGS. 1 and 2, in its closed position the cover 2 closes the vehicle top storage compartment opening 4 and extends essentially in a horizontal plane which runs parallel to the plane of projection in FIGS. 1 and 2. In its closed position, the cover 6 can be used as a rear parcel shelf.

Figure 3:
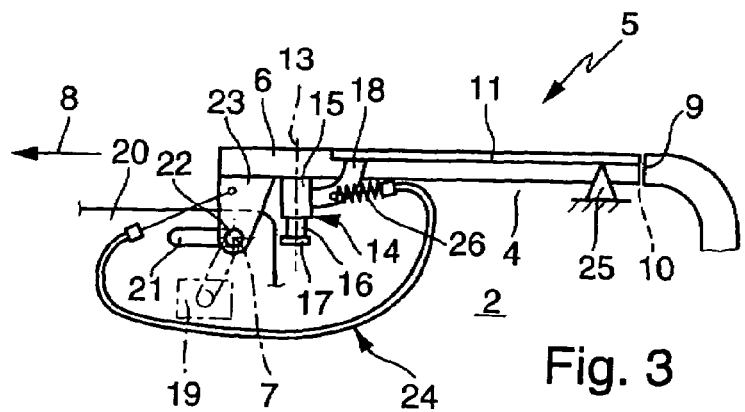
FIGS. 3 to 6 show greatly simplified schematic illustrations of the cover device in a side view in different states.
Figure 4:
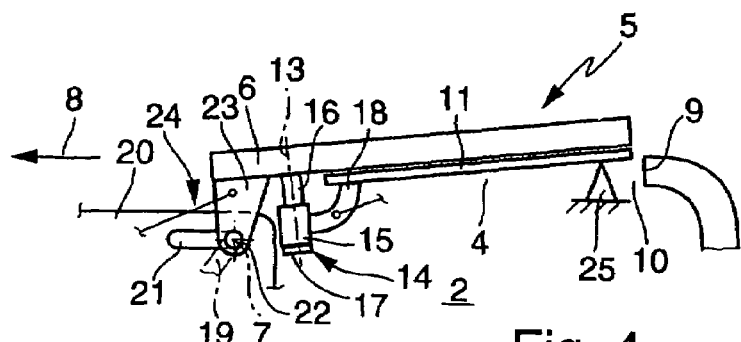
Figure 5:
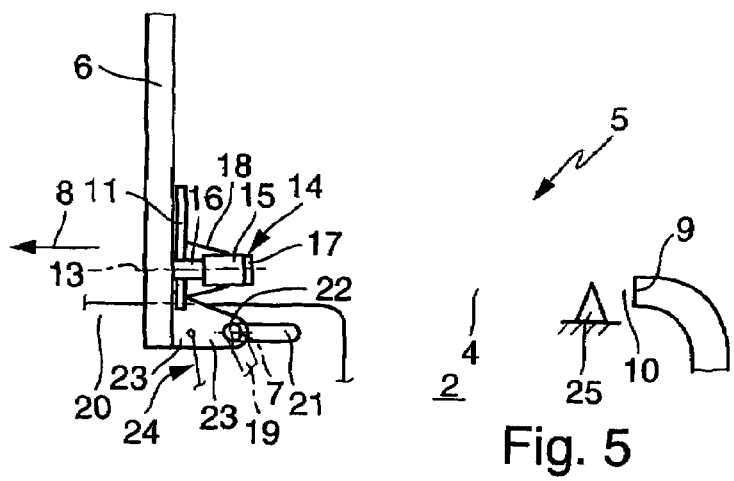
Figure 6:
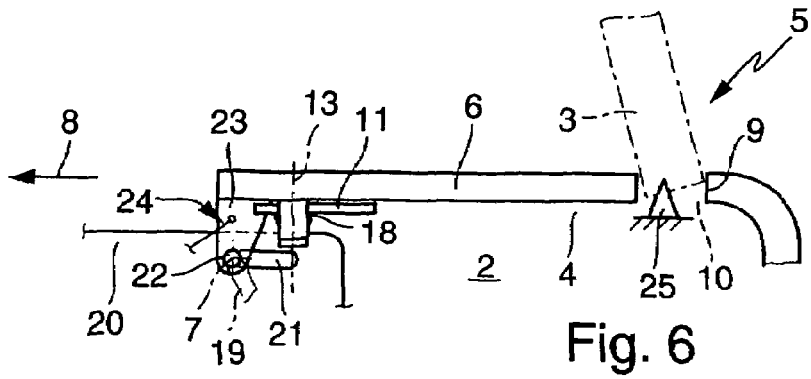

As emerges from FIGS. 1 and 2, the cover 6 can also be adjusted in the longitudinal direction 8 of the vehicle between a rear position, which is shown in FIGS. 1, 3 and 4, and a front position, which is shown in FIGS. 2, 5 and 6. The terms "front" and "rear" refer here to the direction of travel of the vehicle. When the vehicle roof 3 is closed, a rear passage gap 10 is required between the cover 6 and an edge 9 of the vehicle top storage compartment opening 4 in order to be able to guide a rear section of the vehicle roof 3 out of the vehicle top storage compartment 2 through this passage gap 10 and to be able to position it. Accordingly, in its front closed position according to FIGS. 2 and 6, the cover 6 releases this passage gap 10 and opens the latter. In contrast to this, when the vehicle roof 3 is open, the passage gap 10 is not required. Accordingly, in its rear closed position according to FIGS. 1 and 3, the cover 6 closes this passage gap 10.

The cover device 5 also has two side flaps 11 which are arranged on sides of the cover 6 that lie opposite each other transversely with respect to the longitudinal axis 8 of the vehicle. These side flaps 11 can be adjusted in each case between an active position, which is shown in FIGS. 1, 3 and 4, and a passive position, which is shown in FIGS. 2, 5 and 6. In their active position, the side flaps 11 according to FIG. 1 close respective passage openings 12 which are in each case laterally adjacent to the cover 6, i.e. transversely with respect to the longitudinal direction 8 of the vehicle, if the cover is in its closed position. These passage openings 12 are required for the closed vehicle roof 3 in order to guide rear sections, in particular C-pillars, which are also arranged laterally here, out of the vehicle top storage compartment 2. Accordingly, when the vehicle roof 3 is open, according to FIG. 1, the side flaps 11 are in their active position in order to close the lateral passage openings 12. In contrast to this, when the vehicle roof 3 is closed, according to FIG. 2, the passage openings 12 are required, to which end the side flaps 11 are adjusted into their passive position in which they release or open the lateral passage openings 12. In addition, the side flaps 11 extend parallel to the cover 6 in their passive position too, in which case the side flaps 11 are pivoted in under the cover 6. That is to say, the side flaps 11 in their passive position, in the plan view according to FIG. 2, are concealed by the cover 6 and therefore do not require any significant storage space in the interior of the vehicle.

Furthermore, in their active position according to FIG. 1, the side flaps 11 extend essentially in the plane of the cover 6, as a result of which a shape-integrated overall covering is produced for the vehicle top storage compartment opening 4.

In order to be able to adjust the side flaps 11 between their passive position and their active position, the side flaps 11 are firstly mounted in a manner such that they can pivot in each case about a flap axis 13, each flap axis 13 running perpendicularly with respect to the cover 6. Accordingly, the flap axes 13 run perpendicularly with respect to the plane of projection in FIGS. 1 and 2 while they lie in each case in the plane of projection in FIGS. 3 to 6.

Since the side flaps 11, in their active position according to FIG. 1, extend in the same plane as the cover 6 and, in their passive position according to FIG. 2, are arranged below the cover 6, a lifting adjustment between the cover 6 and side flaps 11 is also required.

According to FIGS. 3 to 6, each side flap 11 is mounted on the cover 6 via a bearing arrangement, which arrangements are in each case designed, in the preferred embodiment shown here, as rotary/sliding bearings 14. A rotary/sliding bearing 14 of this type comprises a cylindrical sleeve 15 and a cylindrical bolt 16 onto which the sleeve 15 is placed concentrically. The bolt 16 and sleeve 15 are coordinated with each other in such a manner that the sleeve 15 is mounted in a rotatable and axially displaceable manner on the bolt 16.

In the preferred embodiment shown here, the bolt 16 is fastened to the lower side of the cover 6 and protrudes essentially vertically from the latter. A disk-shaped stop 17 which restricts the axial displaceability of the sleeve 15 is formed at the free end of the bolt 16. The sleeve 15 is connected fixedly to the associated side flap 11 via an arm 18. The sleeve 15 and bolt 16 define the particular flap axis 13 which accordingly runs concentrically with the sleeve 15 and bolt 16.

A first driving device 19, which is illustrated merely by way of indication in FIGS. 3 to 6 and can in principle be constructed as desired, is provided for adjusting the cover 6. This first driving device 19 is designed in such a manner that, firstly, it permits the pivoting adjustment of the cover 6 about the cover axis 7 and, secondly, also serves to displace the cover 6 in the direction of the longitudinal axis 8 of the vehicle. For example, the first driving device 19 comprises for this purpose a bearing console 20 in which is formed an elongated hole 21 which runs parallel to the longitudinal axis 1 of the vehicle and in which a shaft 22, which runs concentrically with the cover axis 7, is displaceably mounted. The cover 6 is then mounted on this shaft 22 via tabs 23.

In order to adjust the side flaps 11, a second driving device 24 is provided which is designed in such a manner that it can exclusively realize a rotational adjustment of the particular side flap 11 about the associated flap axis 13. This second driving device 24 is formed, for example, by a Bowden cable which is arranged in a suitable manner. The Bowden cable shown can be equipped with a restoring spring 26 which is fitted at a suitable point.

While the rotatability of the sleeve 15 on the bolt 16 is therefore predetermined by the second driving device 24, the sleeve 15 can be adjusted in principle freely between the stop 17 and the lower side of the cover 6 in the axial direction along the bolt 16.

In addition, at least one fixed support 25, i.e. fixed in position in relation to the vehicle top storage compartment 2, is provided in the region of each passage opening 12 for the particular side flap 11, on which support the associated side flap 11 rests in its active position when the vehicle top storage compartment 2 is closed. This state is reproduced in FIG. 3.

A support 25 of this type can be integrated, for example, in the edge 9 of the vehicle top storage compartment opening 4, for example by a step which projects into the vehicle top storage compartment opening 4 and on which the side flap 11 comes to rest being formed on the edge 9.

The cover device 5 according to the invention functions as follows:

In the state according to FIG. 3, the vehicle roof 3 is stored in the vehicle top storage compartment 2, i.e. the vehicle roof 3 is opened. The vehicle top storage compartment 2 or its vehicle top storage compartment opening 4 is closed by the cover 6, the cover 6 being in its rear closed position in order thereby also to close the passage gap 10. The side flaps 11 are in their active position and accordingly close the lateral passage openings 12. In order to close the vehicle roof 3, first of all the vehicle top storage compartment opening 4 has to be released. For this purpose, the first driving device 19 drives the cover 6 in such a manner that the latter first of all pivots upward about its cover axis 7. Since the side flaps 11 are mounted in an axially freely adjustable manner on the bolts 16, they remain on their particular support 25 at the start of the pivoting movement of the cover 6. By means of the action of gravitational force and/or by means of spring force the side flaps 11 can slide downward along the bolts 16 when the cover 6 pivots upward. Since, during the pivoting of the cover 6, the spatial position of the bolts 16 also changes, the side flaps 11 are thereby also correspondingly pivoted or tilted. FIG. 4 reproduces the state in which the side flaps 11 are just in contact with their supports 25 when the cover 6 is pivoted up or are just coming into contact with their particular support 25 when the cover 6 is pivoted down.

By means of the axially free mobility between the sleeve 15 and bolt 16, the lifting adjustment of the side flaps 11 for lowering them from the raised position, which is shown in FIG. 3 and in which the upper sides of the cover 6 and of the side flaps 11 extend approximately in one plane, i.e. on the same level, into the lowered position, which is reproduced in FIG. 4 and in which the side flaps 11 are situated below the cover 6, takes place virtually automatically by means of the action of gravitational force and/or spring force when the cover 6 pivots upward. In a corresponding manner, the lifting adjustment in order to raise the side flaps 11 from the lower position according to FIG. 4 into the upper position according to FIG. 3 also takes place virtually automatically if the side flaps 11, in the end phase of the cover 6 pivoting downward, come to rest on their respective supports 25, as a result of which the latter prevent a further lowering of the side flaps 11, so that the side flaps 11 are raised relative to the cover 6 if the latter pivots further downward.

The described construction does not require any separate driving means for the lifting adjustment of the side flaps 11 relative to the cover 6, as a result of which the cover device 5 according to the invention can be realized particularly inexpensively.

During the transition between the pivoting positions of FIGS. 4 and 5, a longitudinal displacement of the cover 6 in the direction of the longitudinal axis 8 of the vehicle also takes place. In the open position of the cover 6 that is shown in FIG. 5, the cover is therefore also in its front position. This longitudinal adjustment is likewise brought about by means of the first driving device 19. According to one expedient embodiment, the second driving device 24 is coupled to the first driving device 19 in such a manner that, during this longitudinal adjustment, the desired rotational adjustment of the side flaps 11 about their flap axes 13 inevitably arises. This is achieved, for example, by means of an appropriately fitted Bowden cable.

The forced coupling of the driving devices 19 and 24 ensures that, in the front position of the cover 6 according to FIGS. 5 and 6, the side flaps 11 take up their passive position, in which they are pivoted in under the cover 6.

In this open position of the cover 6, the vehicle roof 3 can be moved out of the vehicle top storage compartment 2 or can be moved into the vehicle top storage compartment 2.

If the cover 6 in its front position is subsequently pivoted downward, the side flaps 11 remain in their passive position, with the result that, in the front closed position of the cover 6 according to FIG. 6, the lateral passage openings 12 and the rear passage gap 10 for the vehicle roof 3 are free or opened.

The same applies if the cover 6 is moved back from its front position according to FIGS. 5 and 6 into its rear position according to FIGS. 3 and 4: the forced coupling of the kinematics of the cover 6 to the kinematics of the side flaps 11 forces, as the cover 6 moves back into its rear position, the side flaps 11 to pivot out into their active position or into an intermediate position from which they can be raised into their active position relative to the cover 6.

The invention claimed is:

1. A cover device for a vehicle top storage compartment of a convertible vehicle, said compartment serving to store a vehicle roof, said cover device comprising:

a cover which is mounted in a manner such that it can be adjusted by pivoting about a cover axis, which runs transversely with respect to a longitudinal axis of the vehicle and horizontally, between a closed position, in which the cover extends essentially in a horizontal plane and closes a vehicle top storage compartment opening, and an open position, in which the cover is inclined with respect to the horizontal plane and opens the vehicle top storage compartment opening, two side flaps which are arranged on sides of the cover that lie opposite each other transversely with respect to the longitudinal axis of the vehicle, which side flaps can be adjusted between a passive position, in which, on each side of the vehicle in the closed position of the cover, they open a respective passage opening, which is laterally adjacent to the cover and is required for the closed vehicle roof, and extend parallel to the cover in a manner pivoted in above or under it, and an active position, in which, in the closed position of the cover, they close the passage openings and extend in the plane of the cover, a first driving device which drives the cover about the cover axis for pivoting adjustment, and a second driving device which drives at least one of the side flaps about an associated flap axis, which runs perpendicularly with respect to the cover, for pivoting adjustment, wherein each of the two side flaps is mounted on the cover via a bearing arrangement in such a manner that each side flap can be lowered relative to the cover and, in the lowered position, can be pivoted about the associated flap axis, wherein the second driving device drives the side flaps exclusively for the pivoting adjustment about the flap axes, wherein the side flaps are mounted and arranged in such a manner that the lowering of the side flaps takes place automatically when the cover is opened, wherein each of the bearing arrangements is designed as a rotary/sliding bearing, wherein each rotary/sliding bearing has a cylindrical sleeve which is plugged in an axially displaceable and rotatable manner onto a cylindrical bolt, wherein the sleeve or the bolt is fastened to a lower side of the cover and protrudes vertically therefrom while the bolt or the sleeve is fastened to the particular side flap, wherein the bolt and the sleeve are in each case arranged concentrically to one of the flap axes, wherein the sleeve is arranged in an axially freely adjustable manner on the associated bolt, and wherein at least one fixed support is provided in a region of the passage openings for each side flap, on which support the particular side flap, which has been pivoted into its active position, comes to rest when the cover is lowered into the closed position and which in the process raises the side flap along the flap axis into the plane of the cover.

2. The cover device as claimed in claim 1, wherein the side flaps are mounted and arranged in such a manner that lowering of the side flaps takes place by way of gravitational force, spring force of a spring, or by way of resistance force of a stop or a guide slot when the cover is opened.

3. The cover device as claimed in claim 1, wherein the second driving device is coupled, in terms of drive, directly or indirectly to at least one of the cover and the first driving device, so that, during an adjustment of the cover, the side flaps are inevitably driven.

4. The cover device as claimed in claim 1, wherein the cover can be adjusted between a front position, in which, when the vehicle roof is closed, the cover takes up a front closed position in which the cover opens a passage gap, which is rearwardly adjacent to the cover and is required for the closed vehicle roof, and a rear position, in which, when the vehicle roof is opened, the cover takes up a rear closed position in which the cover closes the passage gap.

5. The cover device as claimed in claim 4, wherein the first driving device drives the cover essentially in the direction of the longitudinal axis of the vehicle to adjust it between the front position and the rear position, and wherein the second driving device is kinematically coupled to the first driving device in such a manner that an adjustment of the cover from its rear position into its front position pivots the side flap into its passive position, and an adjustment of the cover from its front position into its rear position pivots out the side flap into its active position.

6. The cover device as claimed in claim 1, wherein the support is formed by a step formed on an edge of the passage opening.

7. The cover device as claimed in claim 2, wherein the second driving device is coupled, in terms of drive, directly or indirectly to at least one of the cover and the first driving device, so that, during an adjustment of the cover, the side flaps are inevitably driven.

8. The cover device as claimed in claim 2, wherein the cover can be adjusted between a front position, in which, when the vehicle roof is closed, the cover takes up a front closed position in which the cover opens a passage gap, which is rearwardly adjacent to the cover and is required for the closed vehicle roof, and a rear position, in which, when the vehicle roof is opened, the cover takes up a rear closed position in which the cover closes the passage gap.

9. The cover device as claimed in claim 8, wherein the first driving device drives the cover essentially in the direction of the longitudinal axis of the vehicle to adjust it between the front position and the rear position, and wherein the second driving device is kinematically coupled to the first driving device in such a manner that an adjustment of the cover from its rear position into its front position pivots the side flap into its passive position, and an adjustment of the cover from its front position into its rear position pivots out the side flap into its active position.

10. The cover device as claimed in claim 3, wherein the cover can be adjusted between a front position, in which, when the vehicle roof is closed, the cover takes up a front closed position in which the cover opens a passage gap, which is rearwardly adjacent to the cover and is required for the closed vehicle roof, and a rear position, in which, when the vehicle roof is opened, the cover takes up a rear closed position in which the cover closes the passage gap.

11. The cover device as claimed in claim 10, wherein the first driving device drives the cover essentially in the direction of the longitudinal axis of the vehicle to adjust it between the front position and the rear position, and wherein the second driving device is kinematically coupled to the first driving device in such a manner that an adjustment of the cover from its rear position into its front position pivots the side flap into its passive position, and an adjustment of the cover from its front position into its rear position pivots out the side flap into its active position.

12. The cover device as claimed in claim 2, wherein the support is formed by a step formed on an edge of the passage opening.

13. The cover device as claimed in claim 3, wherein the support is formed by a step formed on an edge of the passage opening.

14. The cover device as claimed in claim 4, wherein the support is formed by a step formed on an edge of the passage opening.

15. The cover device as claimed in claim 5, wherein the support is formed by a step formed on an edge of the passage opening.

16. The cover device as claimed in claim 7, wherein the support is formed by a step formed on an edge of the passage opening.

17. The cover device as claimed in claim 8, wherein the support is formed by a step formed on an edge of the passage opening.

18. The cover device as claimed in claim 9, wherein the support is formed by a step formed on an edge of the passage opening.

19. The cover device as claimed in claim 10, wherein the support is formed by a step formed on an edge of the passage opening.

20. The cover device as claimed in claim 11, wherein the support is formed by a step formed on an edge of the passage opening.

* * * * *